United States Patent [19]

Jordanov et al.

[11] 4,076,521
[45] Feb. 28, 1978

[54] METHOD FOR CONTINUOUSLY BLOWING MATERIALS INTO MOLTEN SLAGS

[75] Inventors: Jordan Todorov Jordanov; Georgi Ivanov Abrashev; Velyu Dimitrov Jekov; Georgi Taney Georgiev; Georgi Alexandrov Haralampiev; Janco Hristov Janev; Velcho Angelov Prodanov, all of Plovdiv, Bulgaria

[73] Assignee: Kombinat Za Zventi Metali "Dimiter Blagoev", Plovdiv, Bulgaria

[21] Appl. No.: 636,434

[22] Filed: Dec. 1, 1975

Related U.S. Application Data

[63] Continuation of Ser. No. 72,484, Sep. 15, 1970, abandoned, which is a continuation-in-part of Ser. No. 620,018, Mar. 2, 1967, abandoned.

[51] Int. Cl.² .................... C21B 3/04; C22B 13/00
[52] U.S. Cl. ................................. 75/24; 75/63; 75/77; 75/78; 75/89
[58] Field of Search .............. 266/232; 75/24, 77, 75/78, 21, 23, 63, 89

[56] References Cited

U.S. PATENT DOCUMENTS

| | | | |
|---|---|---|---|
| 2,890,951 | 6/1959 | Roy | 75/77 |
| 3,300,301 | 1/1967 | Malmstrom | 75/77 |
| 3,663,207 | 5/1972 | Themelis et al. | 75/77 |

*Primary Examiner*—Walter R. Satterfield

[57] ABSTRACT

A metallurgical method and apparatus; air is continuously blown into a mixture of agglomerates of lead concentrates and carbonaceous fuel in a shaft furnace. The resulting slag is delivered from the shaft furnace into a settling tank to which the slag continuously flows while the slag is continuously delivered from the settling tank into a fuming furnace, so that the slag flows in cascade from the shaft furnace to the settling tank and from the settling tank to the fuming furnace, thereby providing a continuous flow of the treated slag from the shaft furnace through the settling tank into the fuming furnace; the slag, in addition, is continuously withdrawn from the shaft furnace.

5 Claims, 3 Drawing Figures

METHOD FOR CONTINUOUSLY BLOWING MATERIALS INTO MOLTEN SLAGS

This is a continuation of application Ser. No. 72,484, filed Sept. 15, 1970 and now abandoned, which in turn is a continuation-in-part of application Ser. No. 620,018 filed Mar. 2, 1967 and now abandoned.

In the treatment of slags which are in a molten condition and obtained in the precessing of non-ferrous ores, it is necessary to blow air and carbonaceous fuel into the molten slag. The present invention deals with a novel method of and an apparatus for providing the continuous blowing of air and carbonaceous fuel into such molten slags.

At the present time in the processing of slags which contain lead, zinc, and other non-ferrous metals, the methods are carried out in a batch-type of process so that continuous operations cannot be achieved. These known batch-methods suffer from several drawbacks, among the most important of which are poor utilization of the furnace inasmuch as a considerable amount of time is spent simply in charging the furnace and tapping off materials therefrom; unavoidable and, in fact, inadmissible losses of material, as well as high labor costs; and unavoidable fluctuations in the operating temperature of an exhaust heat boiler which is provided to make use of the heat derived from the treatment of the slag and which otherwise would be wasted.

While there are indeed some known apparatuses for continuously fuming molten slags which contain non-ferrous metals and which make use of special fuming furnaces for this purpose, the known methods and apparatus have not been used in a practical way because of unavoidable technological difficulties and troubles which are inherent in the known methods and apparatus.

It is one of the primary objects of the present invention to provide a method of and an apparatus capable of continuously processing, by fuming, molten slags which use the same type of aggregates as those which are used in conventional batch processes, while providing a technically improved method and apparatus as compared to the known method and apparatus. One of the primary features of the invention resides in arranging the molten aggregates in cascade so that there is a continuous flow of the slag during the treatment thereof thus assuring a positive and stable control of the continuous process of the present invention.

With the method and apparatus of the present invention it is possible to achieve an uninterrupted tapping off of the slag from the shaft furnace into a settling pool where the temperature of the slag is raised by about 100° C and where any non-ferrous metal (e.g. lead) drops which are carried away with the flowing slag into the settling tank are separated from the latter. In addition, the apparatus of the invention makes it possible to continuously convey the slag, after treatment thereof in the settling tank, into a slag fuming furnace from which the slag is continuously tapped off.

In the drawings accompanying the specification and forming a part thereof:

FIG. 1 schematically illustrates in a top plan view one possible apparatus of the present invention for practicing the method of the present invention;

Figure 1:
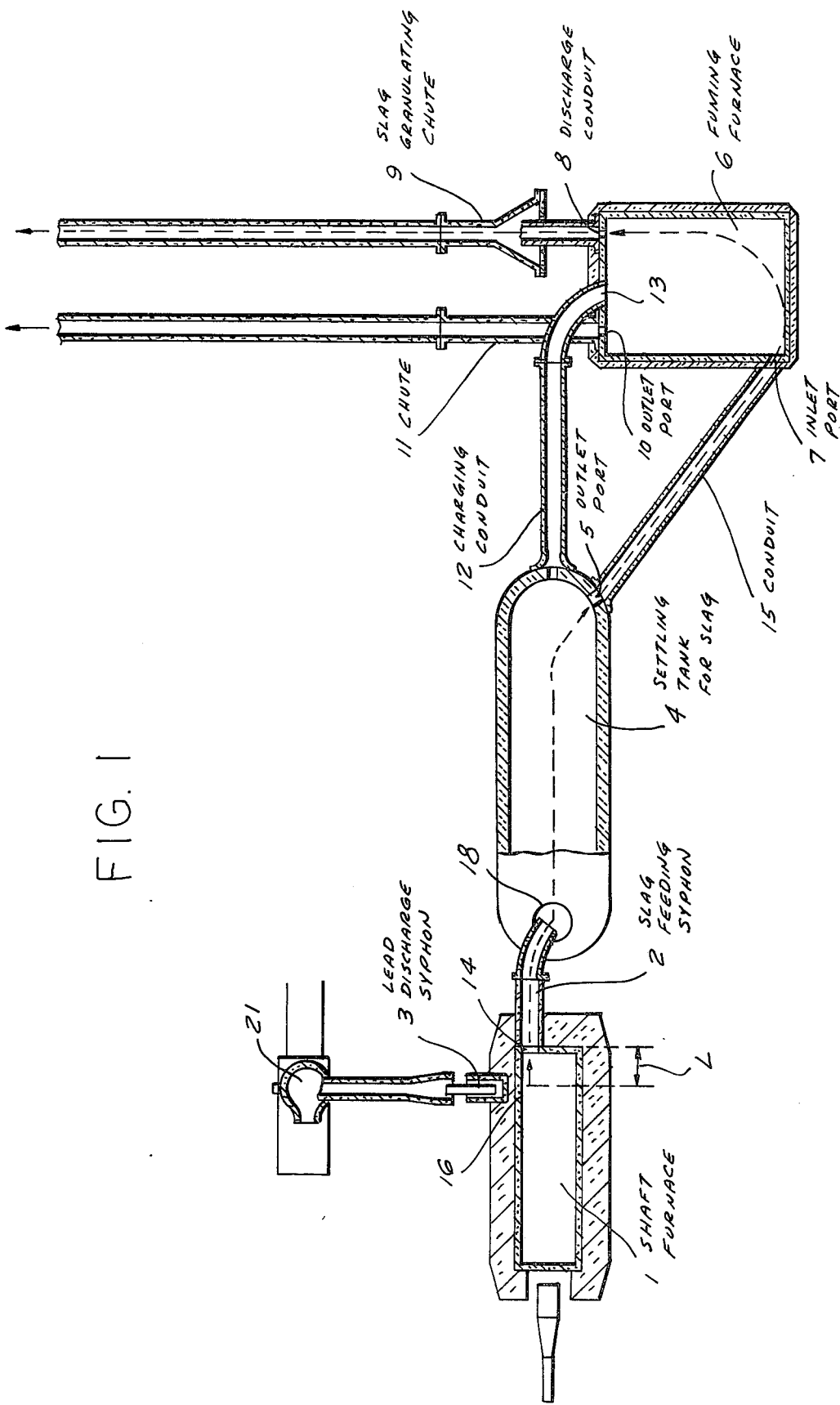

Referring now to the drawings, there is indicated in FIG. 1, in a top plan view, a shaft furnace 1 into which a mixture of agglomerates of lead concentrates and coke is subjected to blasts of air from tuyeres of which one is shown at 22. The molten non-ferrous metal, here described as lead, is tapped off by way of a lead discharge conduit means 3 which communicates with the interior of the shaft furnace 1 through a tapping hole 16 at the level of the bath of molten lead therein so that this bath will flow out through the discharge syphon 3 to be received in a suitable ladle 21, as schematically indicated in the drawing.

A feeding syphon or conduit means 2 is provided for continuously feeding slag from the shaft furnace 1 through a port 14 into a generally covered settling tank 4; this feeding syphon means 2 is in the form of a tube or syphon composed in its entirety of slag-resistant refractory materials which do not have any cooling elements incorporated in them, so that the slag flows continuously without ccoling through the feeding syphon means 2 from the shaft furnace 1 into the settling tank 4 through an opening 18 in the cover of tank 4. The surface of the slag in the settling tank 4 is at an elevation which depends upon the elevation of the outlet 5 in the discharge side wall of the settling tank 4. The ends of the conduit means 2 are continuously open so that there is a continuous flow in cascade fashion of slag from the shaft furnace 1 into the settling tank 4. Furnace 1 which is substantially closed, has a stack 1a. The positive pressure in furnace 1 forces the slag and metal through the syphons. Consequently, the flow rates of the slag and metal are constant and independent of the charge in the furnace 1.

The slag discharge port 14 is situated at the level of the bath of molten slag. The slag is pressed through and does not flow downwardly toward the settling tank, but first upwardly, then downwardly and finally in cascade fashion from the shaft furnace toward the settling tank. In such a manner the top of the slag surface in the settling tank can be on an elevation lower, on the same elevation, or on an elevation higher than the slag discharge port in the wall of the shaft furnace. The same is true of the lead discharge. Consequently, it is not necessary to arrange the shaft furnace higher than the settling tank.

The cross-sectional areas of the lead discharging port 16 and of the slag discharge port 14 are not only critical for the process, but they must remain constant during the design life of the shaft furnace in order to insure constant flow rates.

Figure 2:
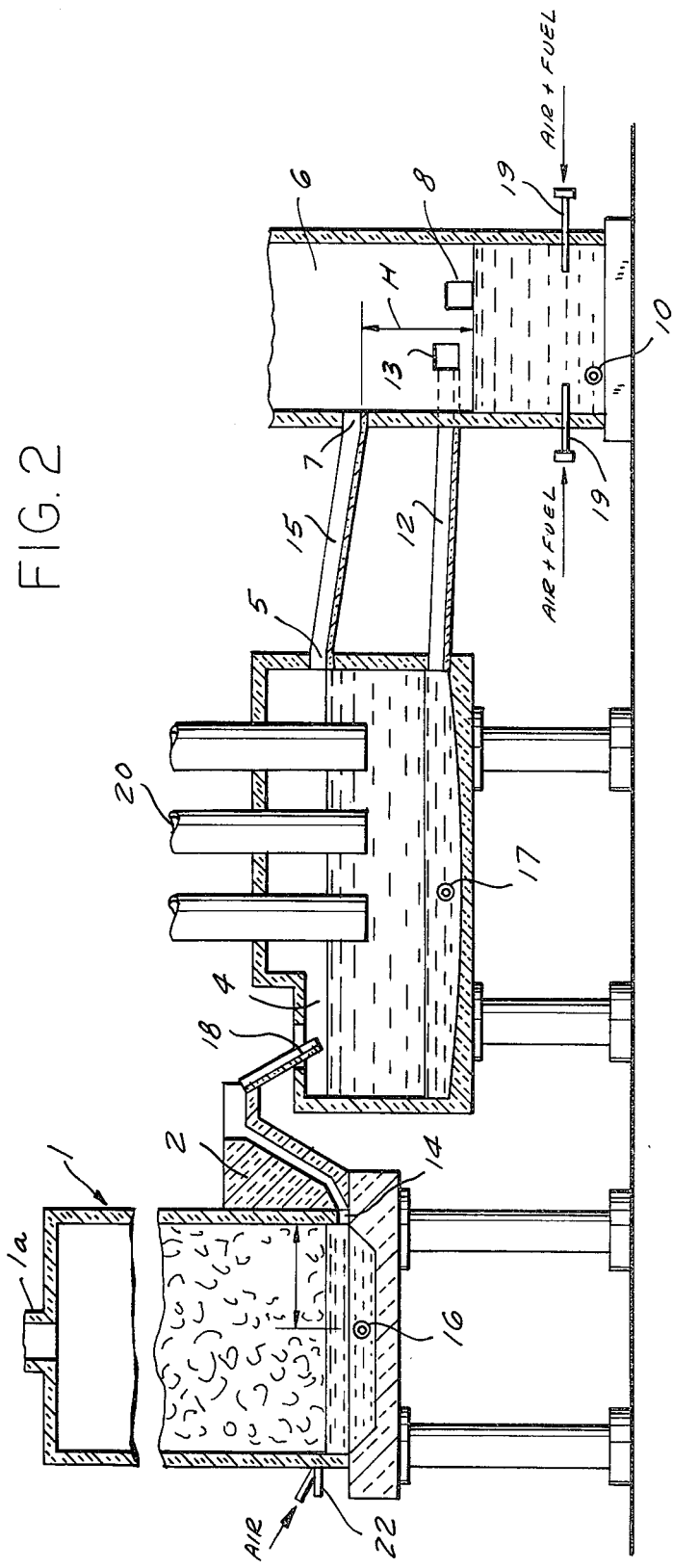
FIG. 2 is a view in longitudinal vertical section through the apparatus.
Figure 3:
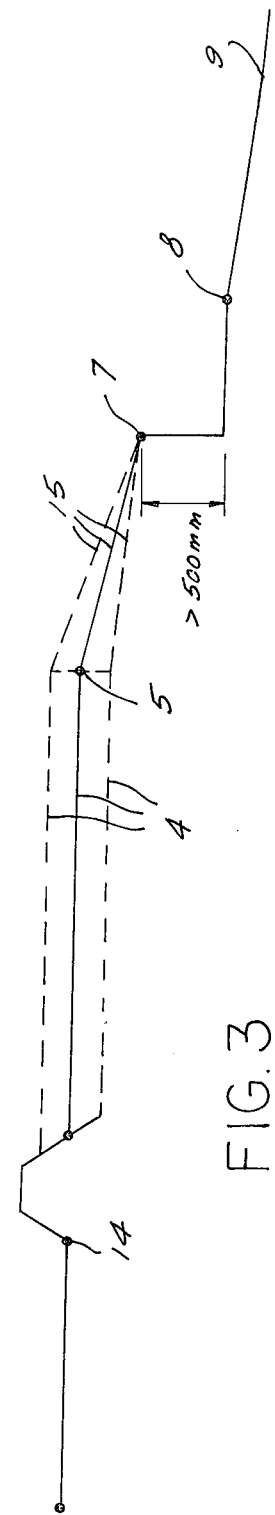
FIG. 3 is a graph illustrating the height relationships of the various parts of the apparatus of FIGS. 1 and 2.

The molten metal is delivered by way of the lead discharge syphon 3, which entrance communicates with the interior of the shaft furnace at the level of the bath of molten metal therein. The cross-sectional area of the channel through the syphon has the same measurement as the cross-sectional area of the lead discharging port. The channel is in the form of a reversed V (FIG. 2). The lead flows with a constant flow rate as described hereinabove. The syphon is composed in its entirety of slag-resistant refractory materials which do not have any cooling element incorporated into them.

The slag flowing out from the discharge end of the syphon runs in cascade fashion into the settling tank and is discharged therefrom in a horizontal flow. Such a change in the flow directions provides for an even distribution, good settling conditions and an even heating of the slag into the settling tank. The cross-sectional area of the outlet port 5 is at least equal or greater than that of the channel through the syphon 2. A tapping hole 17 is provided on the bottom end of the side wall of the settling tank for periodically (every 4–5 days) tapping-off the accumulated lead.

In the settling tank 4 the temperature of the slag is raised by electrodes 20 (three shown) passing downwardly through the cover of the settling tank into the slag. Electric current passing through the slag between electrodes heats the slag.

The apparatus of the invention locates the lead discharge syphon means 3 nearer to the slag discharge syphon means 2, or feeding conduit means for feeding the slag from the shaft furnace 1 to the settling tank 4, than is conventional. Thus, in accordance with one of the features of the invention, the distance L between the axis of conduit means 2 and the entrance of conduit means 3 is from 500 to 1500 mm, as measured in a horizontal plane (FIG. 1), depending upon the size of the furnace 1. The location of the pair of syphon means 2 and 3 closer to each other provides a stabilization in the operating conditions of the shaft furnace and results in a stabilization of the uninterrupted tapping-off of the slag from the shaft furnace into the settling tank.

As was pointed out above, the slag is continuously delivered into the settling tank 4 from the shaft furnace 1 and in the settling tank 4 residual lead droplets are separated from the slag and the temperature thereof is increased by about 100° C. In order to provide a continuous discharge of the treated slag from the settling tank 4, a connecting slag conduit means 15 communicates with a port 5 of the settling tank, this outflow port 5 being situated at the elevation of the surface of the slag in the tank 4.

The connecting conduit means 15 not only communicates permanently with the settling tank 4 but also communicates permanently with the fuming furnace 6 which has an inlet port 7 communicating permanently with the end of the conduit means 15 distant from the port 5. The fuming furnace 6 is of a rectangular configuration and has a width to length ratio of between 1 :: 1 and 1 :: 6. A discharge conduit means 8 communicates with the blast furnace 6 for continuously discharging the slag therefrom, and in accordance with a further feature of the invention the inlet port 7 and the port of the fuming furnace 6 with which the discharge conduit means 8 communicates are situated at diagonally opposed corner portions of the fuming furnace 6 with the port 7 situated at an elevation H (FIG. 2) of at least 500 mm above the elevation of the discharge port with which the discharge conduit means 8 communicates, the surface of the slag in the fuming furnace 6 being situated at the elevation of the discharge port which communicates with the discharge conduit means 8. Thus, the blasted or fumed slag flows continuously out of the fuming furnace 6 through the discharge conduit means 8, and the slag is received in a chute 9 in which granulation of the slag takes place.

The fuming furnace 6 is additionally provided with an outlet port 10 and a chute 11 which are used for emptying the fuming furnace, and this port 10 is closed during the normal operations. The elevation of the port 10 is, of course, substantially lower than that of the discharge port which communicates with the discharge conduit means 8. A mixture of air and liquid fuel is introduced into the lower part of furnace 6 beneath the level of the bath therein through tuyeres 19.

In order initially to charge the fuming furnace 6, a conduit 12 communicates at one end with the settling tank 4 and at its opposite end with the fuming furnace 6 through port 13 in the wall thereof; the ports which communicate with the conduit 12 are closed after the fuming furnace has been charged.

The 500 mm (approximately 20 inches) difference in elevation between the slag inlet port 7 and the slag outlet port 8 in the fuming furnace 6 is critical since during the fuming process the top surface of the slag therein is vigorously agitated (the air + fuel mixture is blown at superatmospheric pressure in the slag at the bottom of the fuming furnace). In the case that the inlet port 7 is not at least at 500 mm over the outlet port 8, the slag flowing through conduit means 15 can be impeded from entering into the fuming furnace by the slag therein being vigorously agitated. Furthermore, the port 7 can be clogged by the slag bursts into the fuming furnace.

The rectangular cross-section of the fuming furnace 6 is imposed by the continuedness of the process. Any direct flow of slag from the inlet of the furnace towards the outlet thereof must be avoided. The slag bath into the furnace must be as uniform in concentration as possible. The width to length ratio is a way to obtain such a uniform concentration of the slag bath. As illustrated in FIG. 1, the inlet port 7 is situated in the corner at the greater distance from the outlet port 8, so that the flow line of the slag across the fuming furnace horizontal plane is as long as is feasible. It is clear that with a ratio range of 1 :: 6, the flow line will be the longest possible. A greater distance between these ports means a uniform concentration, and therefore a uniform treatment. A ratio of 1 :: 4 is adequate for the purposes of the present invention.

It will be noted also that the disposition of the inlet port 7 at 500 mm over the non-agitated top surface of the slag in the fuming furnace 6 also contributes to the uniform concentration of the slag therein. The slag falls in cascade fashion into the furnace 6, and is thoroughly mixed with the slag in the furnace when agitated. Furthermore, the slag is charged in the fuming furnace 6 in one direction and is discharged in a direction at a right angle to the first direction. This is also an advantage for the uniform concentration of the slag in the fuming furnace. The above-described arrangement is critical for the proper treatment of the slag in the fuming furnace 6 in order to recover a high yield of metallic values from the slag in a continuous mode.

The method and apparatus of the present invention make it possible to continuously carry out the blasting of the slag in the fuming furnace 6. In this way, all of the drawbacks inherent in the batch methods are avoided and the capacity or size of the aggregate may be increased by more than 30% with the method and apparatus of the invention. In addition, it is possible to provide conditions which render the operations completely automatic so that the tapping-off and conveying of the slag from the shaft furnace all the way to the chute 9 can be continuously carried out in an automatic manner.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A method for the recovery of non-ferrous metals, comprising the steps of continually introducing an oxygen-containing gas under superatmospheric pressure into a shaft furnace containing a carbonaceous fuel and a mixture of agglomerates of non-ferrous metal concentrates to form a layer of molten metal and a superposed layer of molten slag at the bottom of the shaft furnace, separately tapping the metal layer and the slag from the bottom of the shaft furnace, flowing the tapped slag from the shaft furnace directly into a separate settling tank whereby a mixture of recoverable metal particles and the slag settles and defines a layer below the slag in the settling tank, locally heating the slag in the settling tank above the level of the settled metal particle layer but below the surface of the slag, continually discharging the heated slag from the settling tank to a first location of a separate slag-containing fuming furnace at a level substantially above the level of the slag already present in the fuming furnace, agitating the resulting slag mixture in the fuming furnace, and continuously tapping the slag mixture from the fuming furnace.

2. A method as defined in claim 1, wherein the agglomerates are lead concentrates.

3. A method as defined in claim 1, in which the step of flowing the slag from the shaft furnace to the settling tank comprises syphoning the slag into the settling tank.

4. A method as defined in claim 1, in which the introducing step comprises gravity-flowing the heated slag to the first location of the fuming furnace.

5. A method as defined in claim 1, in which the tapping step comprises withdrawing the slag mixture from the fuming furnace at a point of the slag mixture that is below and opposite to the first location.

* * * * *